United States Patent [19]
Ortega et al.

[11] Patent Number: 5,369,676
[45] Date of Patent: Nov. 29, 1994

[54] REACTOR REFUELING MECHANISM

[75] Inventors: Frank Ortega; David L. Faulstich, both of San Jose, Calif.

[73] Assignee: General Electric Company, San Jose, Calif.

[21] Appl. No.: 108,271

[22] Filed: Aug. 19, 1993

[51] Int. Cl.⁵ .............................................. G21C 19/10
[52] U.S. Cl. .................................................... 376/271
[58] Field of Search ......................... 376/271, 268, 264

[56] References Cited

U.S. PATENT DOCUMENTS

| | | | |
|---|---|---|---|
| 4,427,623 | 1/1984 | Howard et al. | 376/271 |
| 4,666,050 | 5/1987 | Krieger et al. | 376/260 |
| 4,788,028 | 11/1988 | Leclerco et al. | 376/264 |
| 4,929,413 | 5/1990 | Kaufmann et al. | 376/268 |
| 5,085,824 | 2/1992 | Busch et al. | 376/268 |

OTHER PUBLICATIONS

General Electric Company, "BWR/6 General Description of a Boiling Water Reactor," revised Sep. 1980, Title and Notice sheets and pp. 3-6 to 3-8, 4-2 to 4-4, 7-1 to 7-6, and 9-1 to 9-8.

*Primary Examiner*—Daniel D. Wasil
*Attorney, Agent, or Firm*—J. S. Beulick

[57] ABSTRACT

A reactor refueling mechanism includes a bridge, a trolley on the bridge, and an elevator on the trolley, with the elevator including a mast with a grapple at the lower end thereof. The bridge spans a reactor core and is rotatable therearound, with the trolley being translatable over the bridge. The elevator is also rotatable on the trolley, and the mast is vertically movable for positioning of the grapple. The combined movement capability of the mechanism allows the shuffling of fuel bundles between cells in the reactor core, and the accurate placement of square fuel bundles in complementary square cells in the core.

16 Claims, 4 Drawing Sheets

5,369,676

REACTOR REFUELING MECHANISM

BACKGROUND OF THE INVENTION

The present invention relates generally to nuclear reactors, and, more specifically, to a mechanism for refueling a reactor core in a pressure vessel of a boiling water reactor.

A boiling water reactor (BWR) includes a reactor core submerged in water in a closed reactor pressure vessel, with the vessel being disposed in a containment vessel above which is disposed a refueling pool of water. During a refueling cycle, the upper head of the pressure vessel is removed along with internal components of the vessel to provide access to the reactor core therein. Water completely fills the open vessel up to the level of the pool disposed thereabove, and a conventional mobile refueling gantry or platform is movable above the pool for carrying replacement fuel bundles to the reactor core and removing spent fuel bundles therefrom. The platform typically travels longitudinally on rails and has a trolley which moves transversely between the rails, and a telescoping mast with a grapple at the bottom end thereof is carried by the trolley so that fuel bundles may be accurately moved underwater to and from the reactor core.

The core typically includes a two-dimensional horizontal array of square cells in which square fuel bundles are longitudinally inserted and withdrawn therefrom. Since the elevation distance from the refueling platform to the reactor core is typically relatively large, for example about 30 meters, the difficulty and time required to complete the refueling process is relatively high. Since the fuel bundle fits into its mating cell with close tolerances, a significant amount of operator time is required for close-in accurate positioning the fuel bundle therein. And, in the event of any water currents occurring during the refueling operation, the difficulty of accurately inserting a fuel bundle into its mating cell is further increased.

In a typical refueling cycle, about 30 percent of the fuel bundles in the reactor core are replaced. And, a significant portion or all of the remaining fuel is often shuffled or transferred from one position in the core to another for obtaining improved fuel burnup to extend the life thereof. The conventional refueling platform, therefore, must not only remove spent fuel bundles and install replacement fuel bundles, but must also shuffle the remaining fuel bundles between cells to complete the entire refueling operation. Of course, this takes a substantial amount of time which increases costs, as well as increases the amount of radiation exposure time.

SUMMARY OF THE INVENTION

A reactor refueling mechanism includes a bridge, a trolley on the bridge, and an elevator on the trolley, with the elevator including a mast with a grapple at the lower end thereof. The bridge spans a reactor core and is rotatable therearound, with the trolley being translatable over the bridge. The elevator is also rotatable on the trolley, and the mast is vertically movable for positioning the grapple. The combined movement capability of the mechanism allows the shuffling of fuel bundles between cells in the reactor core, and the accurate placement of square fuel bundles in complementary square cells in the core.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
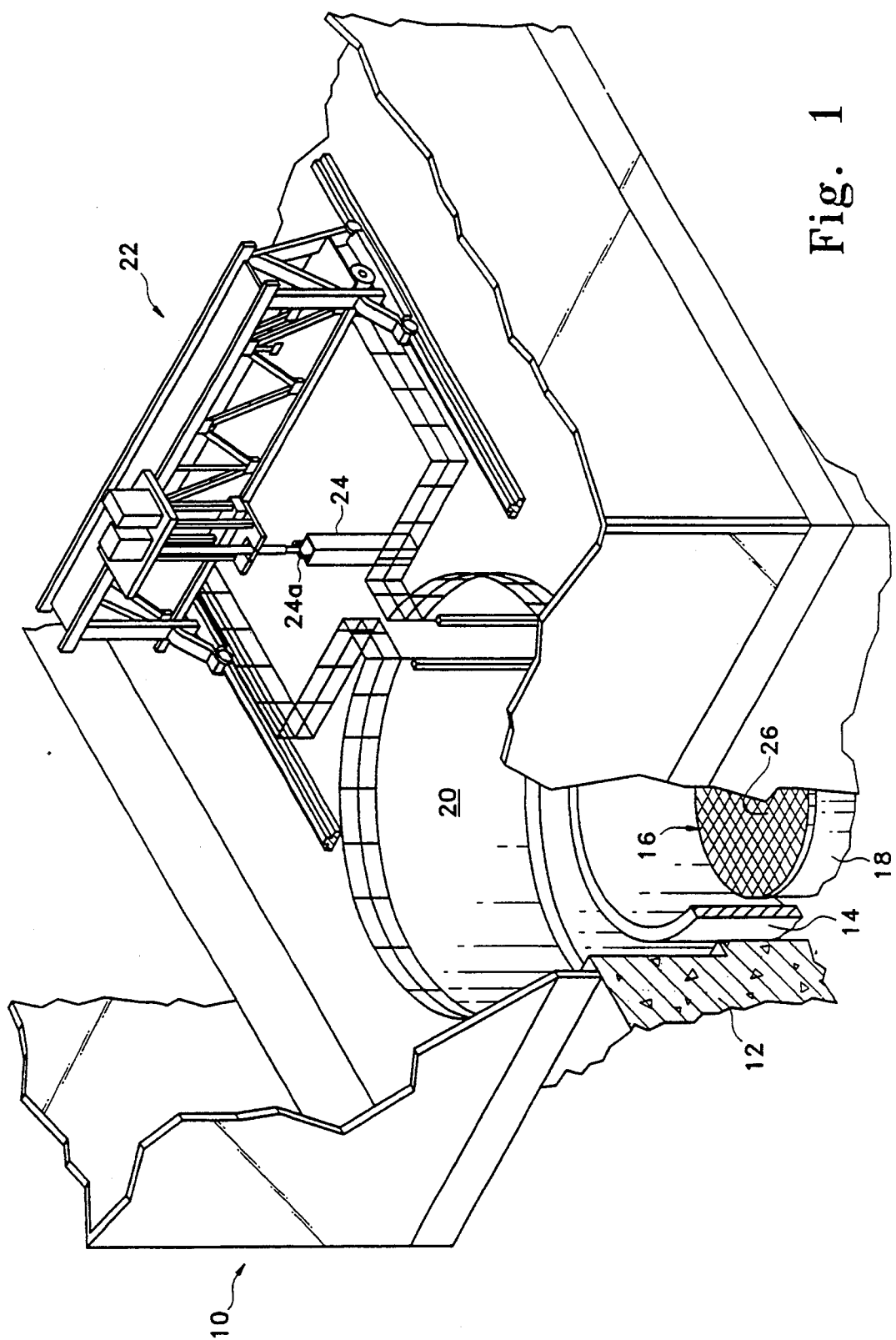
FIG. 1 is a schematic perspective view of a portion of an exemplary reactor building containing a reactor core within a reactor pressure vessel and a containment vessel.

Illustrated schematically in FIG. 1 is a portion of a nuclear reactor building 10 which includes a conventional containment vessel 12 in which is supported a conventional reactor pressure vessel 14. Disposed inside the pressure vessel 14 is a conventional nuclear reactor core 16 having an outer cylindrical core shroud 18. The vessel 14 is illustrated without its conventional upper head thereon and without the typical assemblies disposed therein above the core 16 which have been conventionally removed therefrom in order to allow refueling of the core 16.

Figure 2:
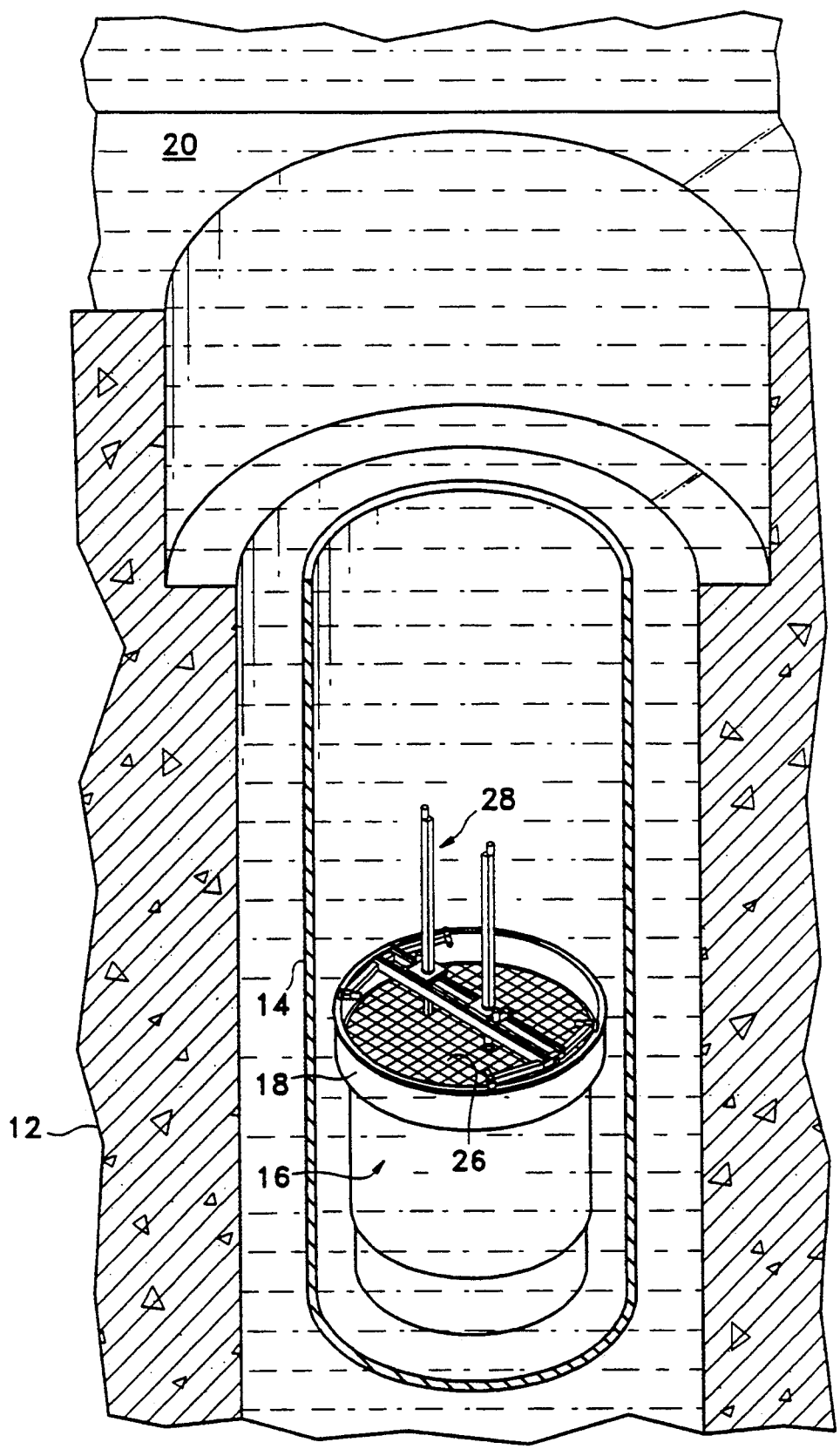
FIG. 2 is a vertical, partly sectional, perspective view of the reactor core disposed in the pressure vessel and supporting a reactor refueling mechanism in accordance with one embodiment of the present invention.

Disposed above the vessels 12, 14 and the core 16 is a conventional upper, or refueling, pool 20 which is suitably filled with water during the refueling operation (not shown in FIG. 1, but shown in FIG. 2). Bridging the floor over the pool 20 is a conventional refueling gantry or platform 22 which conventionally operates to carry fuel bundles 24 one at a time from a storage area underwater through the pool 20 to above the core 16, with the telescoping mast of the refueling platform 22 then lowering the fuel bundle 24 into an empty one of the several cells 26 in the reactor core 16. In a typical boiling water reactor (BWR), the core 16 includes a two-dimensional horizontal array of the cells 26 defined by a top guide within the circular core shroud 18 with the cells 26 spaced inwardly from the perimeter having square configurations, with each cell 26 being configured for receiving four of the fuel bundles 24 side-by-side in a square array.

During conventional operation, the refueling platform 22 begins the refueling cycle by removing one of the spent fuel bundles 24 from the core 16 upwardly through the pool 20 and then laterally therethrough for storage in a suitable location within a remote portion of the pool 20. A replacement fuel bundle 24 is retrieved from another storage location within the pool 20 and carried underwater laterally through the pool and then downwardly through the upper portion of the pressure vessel 14 and into the empty cell 26. Since only about 30 percent of the total number of fuel bundles 24 are typically replaced in each refueling cycle, many of the fuel bundles 24 must be temporarily removed from their respective cells 26 to allow the proper positioning of the replacement fuel bundles 24 and the shuffling of partially spent fuel bundles 24 between the various cells 26 of the core 16. To accomplish the total refueling operation with the single refueling platform 22 takes a substantial amount of time. Furthermore, the cells 26 are typically square, and the fuel bundles 24 are also square and configured for a relatively close fitting tolerance within the cells 26 which increases the difficulty and therefore the duration of the refueling process. Since the refueling platform 26 is located at a substantial elevation above the reactor core 16, for example about 30 meters, substantial time is required for close-in positioning of the fuel bundles 24 within their respective cells 26.

In accordance with the present invention as illustrated in FIG. 2, a portable reactor refueling assembly or mechanism (RRM) 28 is temporarily positioned above the reactor core 16 by a conventional gantry crane (not shown) typically contained in the reactor building 10. The RRM 28 is preferably used in conjunction with the conventional refueling platform 22 to decrease the time required for completing the entire refueling process by shuffling the fuel bundles 24 between the various cells 26 in the core 16, as well as being used to remove spent fuel bundles 24 therefrom and insert replacement fuel bundles 24 therein, with the spent fuel bundles 24 being moved to a temporary location for final removal by the refueling platform 22, and with the replacement fuel bundles 24 being brought to a temporary location by the refueling platform 22 for pickup by the RRM 28. Since the RRM 28 is portable, it may be configured for resting on top of the open reactor pressure vessel 14 (not shown), or in the preferred embodiment illustrated in FIG. 2, the RRM 28 is positioned on the core shroud 18 inside the pressure vessel 14 and is therefore in close proximity to the reactor core 16.

Figure 3:
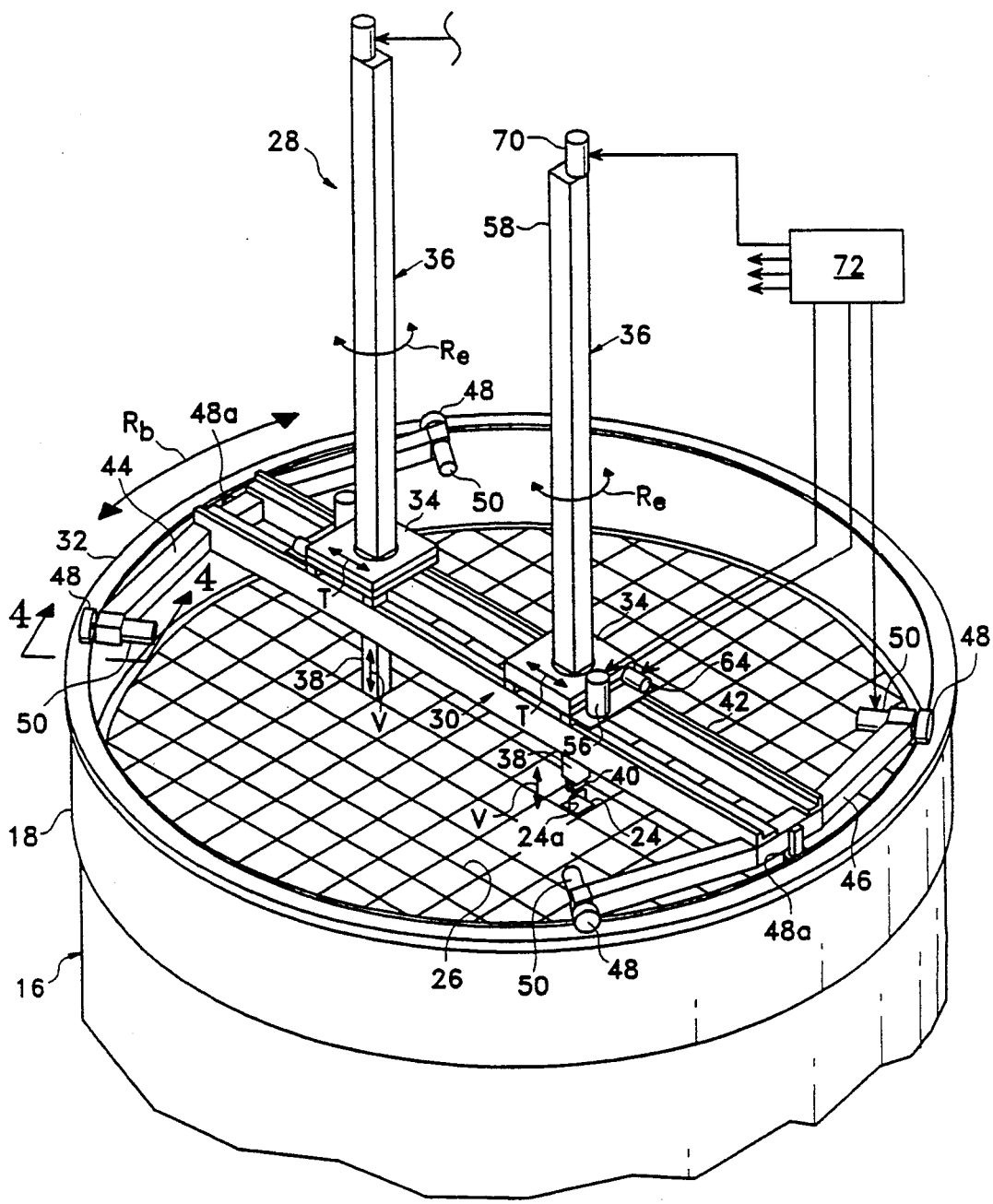
FIG. 3 is an enlarged perspective view of the reactor refueling mechanism illustrated in FIG. 2 supported on the upper end of a core shroud in the pressure vessel.
Figure 4:
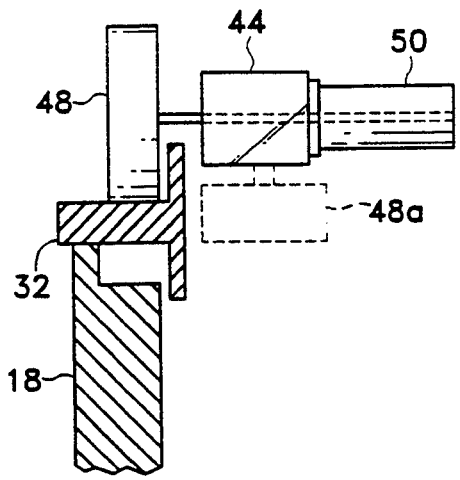
FIG. 4 is a vertical sectional view through the top end of the core shroud illustrated in FIG. 3 and taken along line 4—4 to illustrate a portion of the reactor refueling mechanism.

FIG. 3 illustrates with more particularity the RRM 28 resting on top of the core shroud 18 above the reactor core 16. The RRM 28 includes a rotating bridge 30 which spans the reactor core and is positioned directly above the core 16 and supported by the core shroud 18. Since the top of the core shroud 18 has an accurately machined surface, the RRM 28 preferably also includes an annular or ring rail 32 as shown in FIG. 3, and in cross section in FIG. 4, which is first positioned by the gantry crane on the top of the annular core shroud 18 for protecting the top of the core shroud 18 while providing a suitable surface for supporting the bridge 30 on the core shroud 18 above the core 16 and allowing movement thereof on the rail 32. As shown in FIG. 4, the rail 32 has a horizontal portion which rests atop the core shroud 18, and vertical, cylindrical flanges vertically aligned along the inner diameter of the core shroud 18 to form a generally T-transverse configuration.

Disposed on the bridge 30 is at least one traveling trolley or carriage 34, and in the preferred embodiment illustrated in FIG. 3 a pair of identical trolleys 34 are carried thereon. Identical rotating elevators 36 are disposed on respective ones of the trolleys 34, with each elevator 36 including a vertically movable mast 38 having a conventional grapple 40 at a lower end thereof for releasably holding a load such as the fuel bundle 24 by its bail 24a. The grapple 40 may also be used for holding the conventional blade guides (not shown) of the cells 26 if desired.

Figure 5:
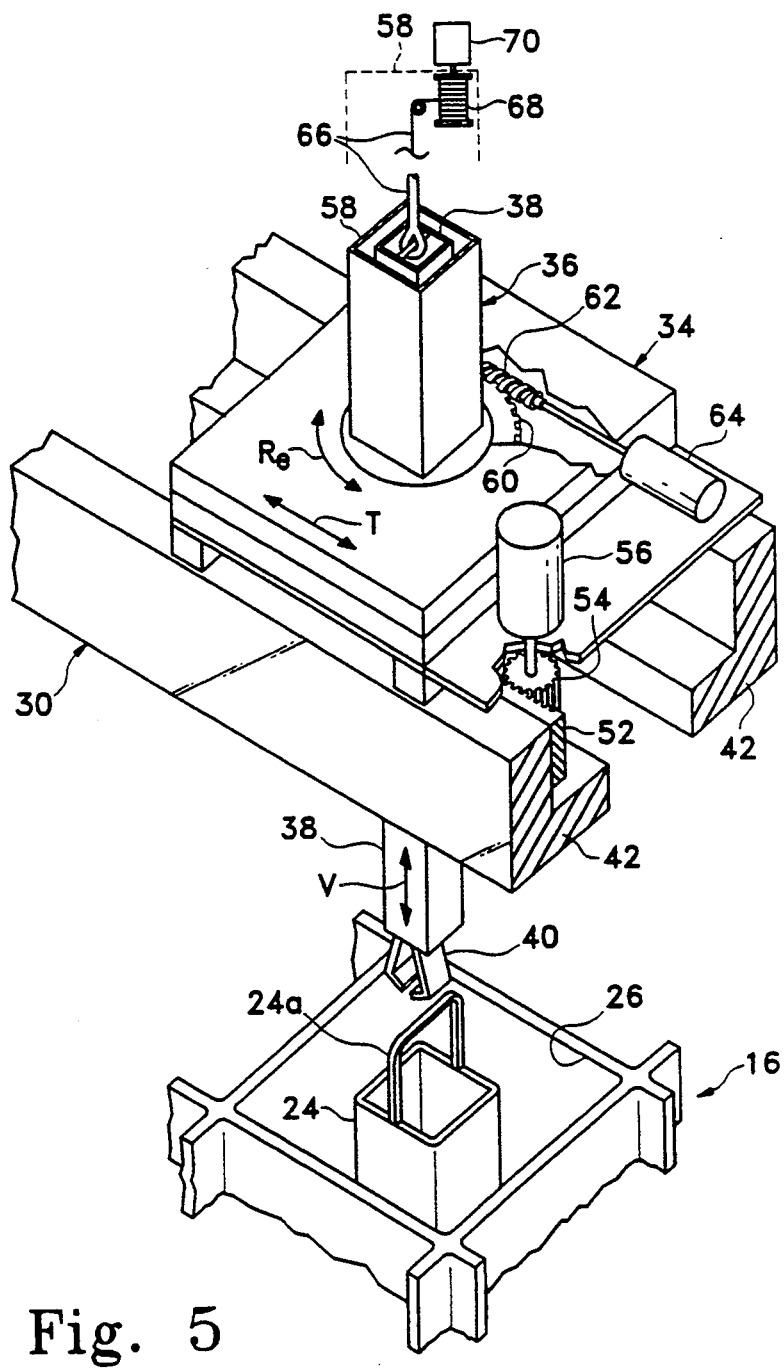
FIG. 5 is an enlarged, perspective, schematic view of a portion of an exemplary elevator and trolley on a bridge of the reactor refueling mechanism illustrated in FIG. 3 for removing or installing a fuel bundle.

Referring again to FIG. 3, means are provided for selectively rotating the bridge 30 around the core 16 on the rail 32 relative to the vertical centerline axis of the core 16, with the rotating directions being illustrated by the double headed arrow designated $R_b$. Means are also provided for selectively translating each of the trolleys 34 independently across or over the bridge 30, with the translation directions being illustrated by the double headed arrow labeled T. Means are also provided for selectively rotating each of the elevators 36 themselves on their respective trolleys 34, with the rotation directions being illustrated by the double headed arrow labeled $R_e$. And, means are also provided for selectively vertically moving the mast 38 of each of the elevators 36 independently to position the respective grapples 40 vertically relative to the core 16, with the vertical directions being illustrated by the double headed arrow V. The grapple 40 may take any conventional form such as a simple hook (not shown), or a pair of grapple fingers as illustrated in FIG. 5, for conventionally releasably holding each of the fuel bundles 24 by their bails 24a for example.

Accordingly, the RRM 28 illustrated in FIG. 3 may be used for positioning the grapple 40 at any desired one of the cells 26 of the core 16 for inserting therein or removing therefrom the fuel bundles 24. The combined rotation $R_b$ of the bridge 30 and the translation T of the trolley 34 is used to horizontally position the grapple 40 vertically above a desired cell 26 in the two-dimensional horizontal array. And, rotation $R_e$ of the elevator 36 may be used to rotate the square fuel bundle 24 carried by the grapple 40 to align it in its respective square cell 36 for accurate vertical insertion therein along the vertical direction V. Since the fuel cell array is checkerboard in pattern, and since the bridge 30 is configured for rotation around the core shroud 18, the rotation of the elevator 36 provides the required rotation of the square fuel bundle 24 being carried by the mast 38 for accurate alignment into its mating square space between adjacent fuel bundles 24 in its cell 26.

Referring again to FIG. 3, the bridge 30 in this exemplary embodiment includes a center frame 42 in the form of two laterally spaced and parallel straight rails extending diametrally across the ring rail 32, and also includes first and second substantially identical end frames 44, 46 fixedly joined transversely on opposite ends of the center frame 42 in a generally I-configuration and disposed on the ring rail 32 by a plurality of spaced wheels 48 rotatably joined to the end frames 44, 46. The wheels 48 are part of the bridge rotating means which support the bridge 30 on the ring rail 32 and allow movement thereon, with a conventional bridge drive motor 50, such as an electrical motor, being joined to a respective one of the end frames 44, 46 for driving at least one of the wheels 48 on the rail 32 to rotate the bridge 30. In the embodiment illustrated in FIG. 3, a drive wheel 48 is positioned on each end of the respective end frames 44, 46, with each wheel 48 being powered independently by a separate motor 50 which may be conventionally operated to rotate the bridge 30 either clockwise or counterclockwise in the $R_b$ direction around the circumference of the core shroud 18 on the ring rail 32. In other embodiments, one motor 50 could be suitably configured to drive both of the wheels 48 on a respective end frame 44, 46. In other embodiments, the drive wheels 48 could be in the form of pinion gears, and the top of the ring rail 32 could have a complementary annular gear rack in a rack-and-pinion type driving arrangement.

As shown in FIGS. 3 and 4, an idler wheel 48a is suitably mounted on each end of the center frame 42 equidistantly between the respective ends of the first and second end frames 44, 46 adjacent to the inner diameter of the ring rail 32 to further guide rotation of the bridge 30 circumferentially around the ring rail 32.

An exemplary one of the trolleys 34 is illustrated with more particularity in FIG. 5, and is slidably disposed on the rails of the center frame 42 for translation therealong in the T direction. The trolley translation means may take any conventional form including, for example, a straight rack gear 52 fixedly joined to one of the rails of the center frame 42 and a cooperating trolley pinion gear 54 operatively joined thereto. A conventional trolley drive motor 56, such as an electrical motor, is suitably fixedly joined to the trolley 34 for driving the trolley pinion gear 54 to translate the trolley 34 fore or aft as desired in the T direction along the center frame 42 between the first and second end frames 44, 46.

An exemplary one of the elevators 36 is illustrated schematically in FIG. 5 and includes an elongate, vertical, square housing 58 containing therein the mast 38 which may also be square for example. The housing 58 is rotatably supported on the trolley 34 by suitable bearings for allowing the rotation thereof in the $R_e$ direction. The elevator rotating means may take any conventional form including an external ring gear 60 suitably joined to the housing 58, and a conventional pinion gear 62, such as a worm gear, is operatively joined thereto with a conventional elevator drive motor 64, such as an electrical motor, being joined to the trolley 34 for driving the elevator pinion gear 62 to rotate the elevator housing 58 and the mast 38 therein in the $R_e$ direction about the vertical centerline axis thereof.

Also shown schematically in FIG. 5 are exemplary means for moving the mast 38 in the vertical V direction which includes a conventional cable 66 suitably joined at one end to the top end of the mast 38 and at its opposite end to a takeup spool 68 at the top of the housing 58, with a conventional mast drive motor 70, such as an electrical motor, being operatively joined to the spool 68 to reel in or wind out the cable 66 for raising and lowering the mast 38. Other conventional means such as a ball-and-screw, or rack-and-pinion, may instead be used for suitably raising and lowering the mast 38. The grapple 40 illustrated in FIG. 5 is in the exemplary form of a pair of pivoting hooks or fingers which are suitably conventionally operated for grasping or releasing the fuel bundle bail 24a. The grapple 40 may take any other conventional form such as a simple fish-type hook for catching the bail 24a.

Referring again to FIG. 3, conventional means are also provided for selectively controlling the bridge rotating means by the drive motors 50, the trolley traveling means by the trolley motor 56, and the elevator rotating means by the elevator motor 64, as well as the mast moving means by the mast motor 70, and the grapple 40 in a conventional fashion. Such control means are illustrated schematically as a programmable digital computer controller 72 operatively joined by suitable connections to all of the various drive motors 50, 56, 64, and 70 of the bridge 30 and the respective trolleys 34 and the elevators 36, as well as to the respective grapples 40. Where the respective motors are electrical motors, the controller 72 may be conventionally joined thereto by suitable electrical lines for selectively providing power thereto to operate the respective motors in opposite rotating directions for obtaining the required movements $R_b$, T, $R_e$, and V. The controller 72, therefore, is used to control and coordinate the several motors for positioning the grapple 40 at any desired or selected location ($R_b$, T) in the two-dimensional horizontal plane above the reactor core 16, and at the selected elevation (V) at that location, and at a selected rotated position ($R_e$) at that location for aligning, for example, the square fuel bundle 24 in its square receptacle. In the preferred embodiment, a pair of the trolleys 34 and elevators 36 are disposed on the center frame 42 of the bridge 30 and are independently controllable by the controller 72.

In operation, one of the trolleys 34 may be positioned over a desired one of the cells 26 by rotating the bridge 30 either clockwise or counterclockwise in the $R_b$ direction and by translating the trolley 34 fore or aft in the T direction. In this way, the mast 38 and grapple 40 may be positioned directly above one of the fuel bundles 24, with the mast 38 being lowered adjacent to the bail 24a. The mast 38 may be rotated either clockwise or counterclockwise in the $R_e$ direction to align the grapple 40 with the bail 24a after which the grapple 40 suitably clasps the bail 24a. The mast 38 may then be raised for removing the captured fuel bundle 26 from its cell 26 for transfer to a temporary storage location or for insertion into a vacant one of the cells 26 at a different location in the core 16 for the reshuffling thereof.

To insert one of the fuel bundles 24 into its cell 26, the bridge 30 is again rotated either clockwise or counterclockwise in the $R_b$ direction as required, and the trolley 34 is translated either fore or aft along the bridge 30 in the T direction to position the fuel bundles 24 directly over the required cell 26. The elevator 36 may then be rotated either clockwise or counterclockwise in the $R_e$ direction as required to align the square fuel bundle 24 over its square receptacle in the cell 26. The mast 38 may then be lowered for lowering the fuel bundle 24 accurately into the cell 26. The grapple 40 is then released for leaving the fuel bundle 24 in its cell 26. The two trolleys 34 and elevators 36 thereon are operated independently for separately removing or installing the fuel bundles 24 for further decreasing the overall time for accomplishing the refueling process.

In an exemplary refueling cycle wherein about one third of the core fuel bundles are replaced and the remaining two thirds shuffled, the RRM 28 can reduce the refueling time up to about one third. The RRM 28 may be operated at the rate of three shuffles per shuffle of the refueling platform 22 and simultaneously therewith. For example, each time the refueling platform 22 either brings to the core 16 or removes therefrom one of the fuel bundles 24, the RRM 28 may be used to perform three shuffles of the fuel bundles 24 either into or from the respective cells 26. The RRM 28 may be operated from a suitably remote location for reducing or eliminating radiation exposure to the operator thereof. And, since the RRM 28 may be positioned closely adjacent to the core 16 by resting on the core shroud 18 in the preferred embodiment, accuracy of operation is improved resulting in shorter reshuffling times.

As indicated above, the RRM 28 could be configured for being positioned on top of the pressure vessel 14 instead of the core shroud 18 which increases its distance from the core 16 but would nevertheless still improve the refueling operation, Upon completion of the refueling operation, the entire RRM 28 assembly is conventionally removed by the gantry crane and stored at a suitable location in the reactor building 10.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the U.S. is the invention as defined and differentiated in the following claims:

1. A reactor refueling mechanism positionable above a nuclear reactor core disposed in a cylindrical core shroud, comprising:
   a bridge positionable above said core;
   a trolley disposed on said bridge;
   an elevator disposed on said trolley and including a vertically movable mast having a grapple at a lower end thereof for releasably holding a load;
   means for rotating said bridge around said core;
   means for translating said trolley along said bridge;
   means for rotating said elevator on said trolley;
   means for vertically moving said mast to position said grapple; and
   an annular rail positionable on said core shroud for supporting said bridge thereon above said core, wherein:
   said bridge comprises a center frame extending diametrally across said rail, and first and second end frames fixedly joined transversely on opposite ends of said center frame and disposed on said rail; and
   said bridge rotating means comprise a plurality of spaced wheels rotatably joined to said first and second end frames and supported on said rail, with a motor driving at least one of said wheels on said rail to rotate said bridge.

2. A mechanism according to claim 1 wherein:
   said trolley is disposed on said center frame for translation therealong; and
   said trolley translating means comprises a rack gear fixedly joined to said center frame and a trolley pinion gear operatively joined thereto, with a motor joined to said trolley for driving said trolley pinion gear on said rack gear to translate said trolley along said center frame between said first and second end frames.

3. A mechanism according to claim 2 wherein:
   said elevator further comprises an elongate, vertical housing containing therein said mast and rotatably supported on said trolley; and
   said elevator rotating means comprises a ring gear fixedly joined to said elevator housing and a pinion gear operatively joined thereto, with a motor joined to said trolley for driving said elevator pinion gear to rotate said elevator housing and said mast therein.

4. A mechanism according to claim 1 wherein:
   said elevator further comprises an elongate, vertical housing containing therein said mast and rotatably supported on said trolley; and
   said elevator rotating means comprises a ring gear fixedly joined to said elevator housing and a pinion gear operatively joined thereto, with a motor joined to said trolley for driving said elevator pinion gear to rotate said elevator housing and said mast therein.

5. A mechanism according to claim 1 further comprising means for selectively controlling said bridge rotating means, said trolley translating means, and said elevator rotating means for positioning said grapple at a selected location in a horizontal plane above said core, and at a selected elevation at said location, and at a selected rotated position at said location.

6. A mechanism according to claim 1 further comprising a pair of said trolleys and said elevators disposed on said center frame and independently controllable.

7. A reactor refueling mechanism positionable above a nuclear reactor core having a plurality of fuel bundle assemblies inside a cylindrical core shroud, comprising:
   means for coupling to a fuel bundle assembly located in said core;
   first moving means for raising said coupling means in a direction parallel to a longitudinal axis of said fuel bundle;
   second moving means for rotating said raised coupling means about said longitudinal axis;
   third moving means for displacing said raised coupling means horizontally along a diameter of said core shroud; and
   fourth moving means for displacing said raised coupling means along a circular path concentric with a centerline axis of said core shroud and having a diameter less than said core shroud diameter,
   wherein said first moving means are supported by said second moving means, said second moving means are supported by said third moving means, said third moving means are supported by said fourth moving means, and said fourth moving means are supported by said core shroud or a reactor pressure vessel surrounding said core shroud.

8. The reactor refueling mechanism as defined in claim 7, wherein said fourth moving means comprise a bridge mounted on said core shroud via rolling means, said third moving means comprise a trolley translatable along said bridge; said second moving means comprise a platform rotatably mounted on said trolley, said first moving means comprise an elevator supported on said platform, and said coupling means comprise a grapple supported by said elevator.

9. The reactor refueling mechanism as defined in claim 8, wherein said fourth moving means are supported by said core shroud via an annular rail positionable on said core shroud for supporting said fourth moving means thereon.

10. The reactor refueling mechanism as defined in claim 9, wherein said bridge comprises a center frame extending diametrally across said rail, and first and second end frames fixedly joined transversely on opposite ends of said center frame, and said rolling means comprise a plurality of spaced wheels rotatably joined to said first and second end frames and supported on said rail, and a motor coupled to drive at least one of said wheels on said rail to rotate said bridge.

11. The reactor refueling mechanism as defined in claim 10, wherein trolley is disposed on said center frame for translation therealong, and said third moving means further comprises a rack gear fixedly joined to said center frame, a trolley pinion gear mounted on said trolley for operatively coupling with said rack gear, and a motor coupled to drive said trolley pinion gear on said rack gear to translate said trolley along said center frame between said first and second end frames.

12. The reactor refueling mechanism as defined in claim 11, wherein said elevator comprises an elongated vertical housing rotatably supported by said trolley, a mast which is vertically displaceable relative to said housing, and a motor coupled to vertically displace said mast relative to said housing, said grapple being connected to an end of said mast.

13. The reactor refueling mechanism as defined in claim 11, wherein said second moving means further comprises a ring gear connected to said platform, a worm gear mounted on said trolley for operatively coupling with said ring gear, and a motor coupled to drive said trolley worm gear on said ring gear to rotate said elevator about said longitudinal axis.

14. The reactor refueling mechanism as defined in claim 8, wherein said rolling means comprises first and second guide rollers means positioned to bear against and roll along a circular cylindrical inner circumferential surface.

15. The reactor refueling mechanism as defined in claim 7, further comprising means for selectively controlling said first through fourth moving means.

16. The reactor refueling mechanism as defined in claim 7, wherein said fourth moving means comprise a bridge mounted on said core shroud via rolling means, said third moving means comprise first and second trolleys translatable along said bridge; said second moving means comprise first and second platforms rotatably mounted on said first and second trolleys respectively, said first moving means comprise first and second elevators supported on said first and second platforms respectively, and said coupling means comprise first and second grapples supported by said first and second elevators respectively.

* * * * *